INVENTOR.
RUDOLF WACHTEL

United States Patent Office 3,358,203
Patented Dec. 12, 1967

3,358,203
NON-COMMUTATOR MOTOR, PARTICULARLY VARIABLE D.C. OR A.C. MOTORS
Rudolf Wachtel, Regensburg, Germany, assignor of twenty percent to Erik Arnhem, Beverly Hills, Calif.
Filed Feb. 11, 1965, Ser. No. 431,824
Claims priority, application Germany, June 25, 1964, W 37,048
4 Claims. (Cl. 318—138)

ABSTRACT OF THE DISCLOSURE

The invention provides an electric motor having a soft iron rotor, said rotor having no windings thereon, and furthermore, not having external electrical connections per se, such as commutators or slip rings. The rotor, which has three symmetrical radial spokes, interacts with two pole pieces spaced 120° apart. The legs of the pole pieces bear a working winding and an induction winding. Current supplied to the working winding is regulated by a type of feedback actuated by the induction winding and controlled by a transistor. The motor is thus enabled to operate on D.C. as well as on A.C. A variable resistor may be included in the feedback circuit for varying speeds. An auxiliary magnetized pole piece serves as a starting aid.

In the electrotechnical art it frequently becomes necessary to drive motors, particularly auxiliary motors, which often are one or several H.P. units, operable by a direct current or an alternating current supply source, without thereby requiring slotted rotors or stators. Hitherto, it was only known to use direct current motors with collectors and/or commutators.

An object of the present invention is to provide a motor having a simple construction and capable of being manufactured at minimum cost, but with the highest possible capability of performance, which can be realized without complicated construction means and particularly, without collector or commutator, so that such a motor can be used in a wider field of utilization. A further object is to provide a motor capable of possessing a wide adjustable speed range.

According to this invention, the above results are achieved by providing a system in which current from a D.C. or A.C. supply source flows through a controlled feedback circuit, and through the winding of a synchronous motor, and in which said current, by variation of induction produced by the movements of the rotor, is transmitted as alternate pulses to the control electrode of the feedback circuit.

Thus, with this arrangement, the motor itself serves, with its induction variations brought about by said movements, as a feedback coupled pulse source. The motor, accordingly, has an appreciable starting torque provided that care is taken that the rotor when in a rest position assumes an asymmetric position, which may be achieved either by arranging a small permanent or current fed auxiliary magnet or by a cone shaped arrangement in the rotor itself and an oblique or claw-shaped coupling which, when the current is switched on, causes the rotor to be placed in such a position that the starting of the latter, in a preferred direction of rotation, is attained.

Figure 1:
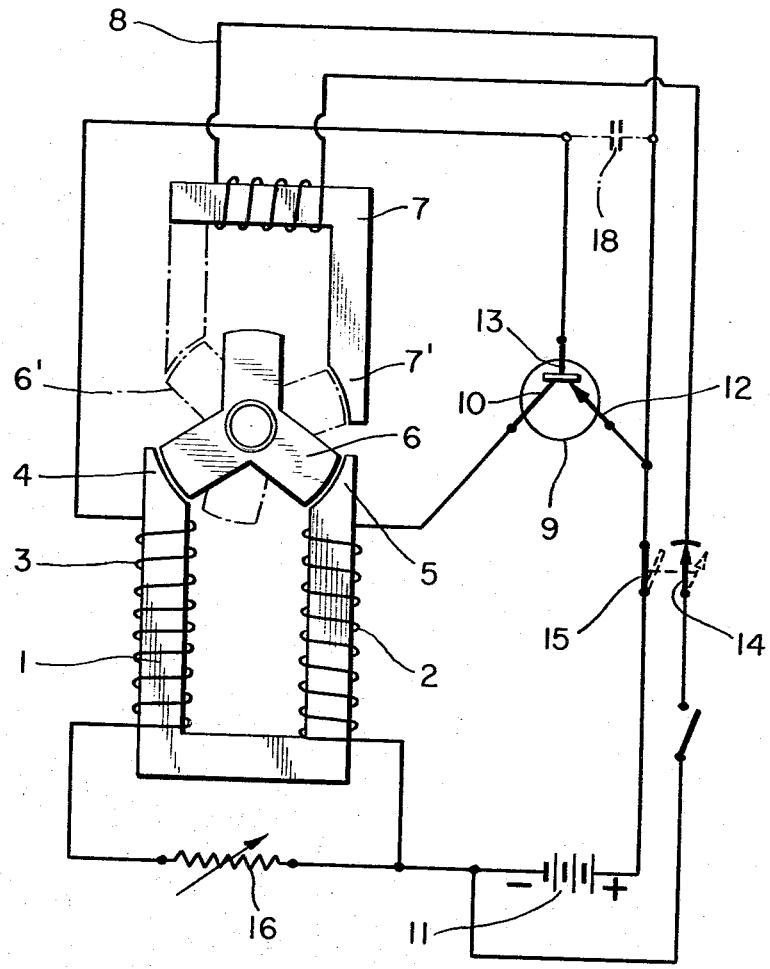
Figure 2:
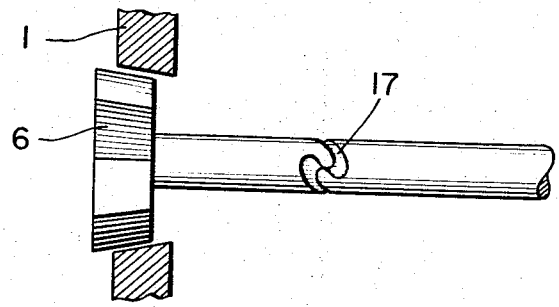

Further objects will be apparent from the following description when considered in connection with the accompanying drawing in which:

FIG. 1 is a wiring diagram of the structural arrangement of the motor as a front axial view, and FIG. 2 is a cross section showing a cone-shaped rotor and an oblique or screw-like coupling.

In FIG. 1, 1 is a horseshoe or U-shaped soft iron part having windings 2 and 3 on each of its legs. The poles 4 and 5 of the soft iron part are adjacent a three-legged rotor 6 and spaced at an angle of about 120°, and an additional one or two legged auxiliary magnet 7 is provided which may either be a permanent magnet or may be provided with a feeder winding 8 arranged laterally and displaced so that the rotor, when in a state of rest, tends to assume the approximate dotted line position 6'. The position, for example, in the case of a permanent magnet, is asymmetrical to the poles 5 and 4, and preferably at 60° to 5 and 180° to 4 in a manner that, when switching on the electric current in winding 2, there is generated a correspondingly strong field, which actuates and urges the rotor in a certain direction of rotation. One single pole 7' is sufficient in most cases. The maintenance of the current pulse, which is generated by the movement of the rotor, occurs by means of a transistor 9 in the example illustrated, the collector electrode of which is connected to that end of the coil 2 which is remote from the battery 11, while its other pole is applied at the negative pole of the battery. The emitter or electrode 12 is connected to the positive pole of the battery 11. A control electrode 13 is connected to the control winding 3 of the stator 1, and by a variable resistance 16 is connected to the negative battery pole 11, and also to the winding 2. A wiping contact 14 may be arranged in the circuit of the coil 8 of the auxiliary magnet 7, which, when actuating switch 15, is contacted briefly, and causes the rotor to take an asymmetric position, from which position said rotor is urged with great force in a certain direction of rotation, when contact 15 is finally closed, and is now set in full motion.

It will be evident that the three-legged rotor 6 presents three radial spokes in a symmetrical arrangement, that is, each spaced 120° from the other two.

FIG. 2 shows, particularly in the case of an auxiliary magnet 7 and 8, the cross section of the motor rotor, which is somewhat cone-shaped, so that, at the moment of excitation of the stator it, is drawn into the field in an axial direction. The coupling 17 is thereby brought into engagement and accordingly, due to its angular and screw-like shape, causes a slight displacement or twisting of the rotor in the screw-like direction, and thus brings about initial rotation in the desired direction.

One may also use an A.C. supply source of current instead of the battery 11. In such a case the electric current is made up of single half-wave pulses. Basically, the transistor 9 may be replaced by other controlled feedback means, such as tubes, etc.; however, a transistor is particularly suitable because of its great dependability, simplicity and performance at low cost.

The feedback may occur, as indicated at 18, in a capacitive manner instead of inductively, when a sufficient effective or apparent resistance, in a known way, is present in the feedback circuit.

I claim:

1. A non-commutator motor, operatable selectively on D.C. and A.C., comprising a rotor of soft iron having the shape of three equidistant radial spokes;
    a pair of pole pieces of soft iron, having two legs and presenting pole faces spaced 120° apart adjacent said rotor spokes;
    a working winding and a pick-up winding on said legs;
    a source of current;
    a current control means;
    electric connection means completing a circuit through said working winding, said current control means and said source;
    connection means connecting said pick-up winding to said current source and said current control means; and an auxiliary magnetized pole piece at an angle of about 60° from said working leg and working pole face and of about 180° from said pick-up pole piece.

2. A motor in accordance with claim 1 wherein said current control means comprises a transistor.

3. A motor in accordance with claim 1 wherein a variable resistance is included in said pick-up circuit between said current source and said current control means.

4. A motor in accordance with claim 1 in which said rotor has a periphery in the shape of a truncated cone and is joined to a shaft through the medium of angular, screwlike-shaped coupling, whereby starting of the motor in a preselected direction is facilitated.

References Cited

UNITED STATES PATENTS

| | | | |
|---|---|---|---|
| 2,895,095 | 7/1959 | Guyton | 318—254 X |
| 2,922,943 | 1/1960 | Rupp | 318—254 |
| 3,050,671 | 8/1962 | Moller | 318—254 |
| 3,091,728 | 5/1963 | Hogan et al. | 318—138 |
| 3,175,140 | 3/1965 | Hogan et al. | 318—254 X |

ORIS L. RADER, *Primary Examiner.*

G. SIMMONS, *Assistant Examiner.*